United States Patent
Gerard et al.

(10) Patent No.: US 10,347,919 B2
(45) Date of Patent: Jul. 9, 2019

(54) FUEL CELL WITH OPTIMIZED OPERATION

(71) Applicant: COMMISSARIAT A L'ENERGIE ATOMIQUE ET AUX ENERGIES ALTERNATIVES, Paris (FR)

(72) Inventors: Mathias Gerard, Grenoble (FR); Patrick Le Gallo, Saint Appolinard (FR); Pascal Schott, Villard de Lans (FR); Remi Vincent, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 308 days.

(21) Appl. No.: 15/300,179

(22) PCT Filed: Mar. 4, 2015

(86) PCT No.: PCT/FR2015/050532
§ 371 (c)(1),
(2) Date: Sep. 28, 2016

(87) PCT Pub. No.: WO2015/150652
PCT Pub. Date: Oct. 8, 2015

(65) Prior Publication Data
US 2017/0179501 A1    Jun. 22, 2017

(30) Foreign Application Priority Data
Mar. 31, 2014    (FR) ...................................... 14 52843

(51) Int. Cl.
*H01M 8/0226* (2016.01)
*H01M 8/0228* (2016.01)
(Continued)

(52) U.S. Cl.
CPC ....... *H01M 8/0228* (2013.01); *H01M 8/0226* (2013.01); *H01M 8/0258* (2013.01); *H01M 2008/1095* (2013.01)

(58) Field of Classification Search
CPC ............. H01M 8/0228; H01M 8/0258; H01M 2008/1095
See application file for complete search history.

(56) References Cited

U.S. PATENT DOCUMENTS

| 7,482,089 B2* | 1/2009 | Shibutani | H01M 4/8605 |
| | | | 429/523 |
| 2005/0277009 A1* | 12/2005 | Mukuda | H01M 8/0213 |
| | | | 429/521 |

(Continued)

FOREIGN PATENT DOCUMENTS

| FR | 2 976 732 A1 | 12/2012 | |
| FR | 2976732 | * 12/2012 | ........ H01M 8/0204 |

OTHER PUBLICATIONS

International Search Report dated Jun. 22, 2015 in PCT/FR2015/050532 Filed Apr. 3, 2015.

*Primary Examiner* — Maria Laios
*Assistant Examiner* — Angela J Martin
(74) *Attorney, Agent, or Firm* — Oblon, McClelland, Maier & Neustadt, L.L.P.

(57) ABSTRACT

A fuel cell, including: first and second electrochemical cells; a two-pole plate arranged between the first and second electrochemical cells, including a conductor support delimiting a first flow channel facing the first electrochemical cell and extending between an air inlet and a water outlet, and including a first conductive coating attached to the conductor support at the air inlet of the first flow channel and including a second conductive coating fastened to the conductor support at the middle part of the first flow channel, the (Continued)

second conductor coating having an electrical surface resistance greater than that of the first conductive coating.

10 Claims, 5 Drawing Sheets

(51) Int. Cl.
*H01M 8/0258* (2016.01)
*H01M 8/1018* (2016.01)
*H01M 8/02* (2016.01)

(56) References Cited

U.S. PATENT DOCUMENTS

| | | |
|---|---|---|
| 2006/0099481 A1 | 5/2006 | Ji et al. |
| 2010/0009229 A1 | 1/2010 | Matsuda et al. |

* cited by examiner

FUEL CELL WITH OPTIMIZED OPERATION

The invention relates to fuel cells, and in particular to the collection of electric current in fuel cells.

Fuel cells are envisaged as an electrical power supply system for future mass-produced motor vehicles, as well as for a large number of applications. A fuel cell is an electrochemical device that converts chemical energy directly into electrical energy. Hydrogen is normally used as the fuel in the fuel cell. The hydrogen is oxidized on an electrode of the cell (the anode) and oxygen from the air is reduced on another electrode of the cell (the cathode). The electrochemical reaction produces water at the cathode, oxygen being reduced and reacting with the protons. The great advantage of the fuel cell lies in avoiding discharges of atmospheric pollutant compounds on the electricity generating site.

For example, proton exchange membrane or PEM fuel cells, exhibit particularly interesting properties of compactness. Each cell includes an electrolytic membrane only allowing the passage of protons and not the passage of electrons. The membrane includes an anode on a first face and a cathode on a second face to form a membrane/electrode assembly referred to as a MEA.

The hydrogen is oxidized at the anode to produce protons passing through the membrane. The electrons produced by this reaction migrate toward a collector plate or flow plate, then pass through an electrical circuit external to the cell to form an electric current. Oxygen is reduced at the cathode and reacts with the protons to form water.

The fuel cell may include multiple flow plates, e.g. made of metal, stacked one on top of the other. The MEA is arranged between two flow plates. The flow plates may include flow channels and orifices for guiding the reagents and products to/from the membrane. The plates are also electrically conductive for forming collectors of the electrons generated at the anode and for conducting these electrons up to the cathode of an adjacent cell. Gas diffusion layers are interposed between the electrodes and the flow plates and are in contact with the flow plates.

MEAs exhibit heterogeneous operation over the length of the air and hydrogen flow channels. On the cathode side, for example, the evolution of the relative humidity of the gases between the inlet (drying conditions) and the outlet (flooding conditions) of the flow channel has an impact on the heterogeneity of the current density. The current density may be less at the flow channel inlet as a result of insufficient moisture. The current density is also less at the flow channel outlet, as a result of excessive moisture capable of flooding the MEA and as a result of oxygen depletion. This heterogeneity of current density may encourage localized corrosion of the carbon in a gas diffusion layer, or degradation of the membrane and/or of the electrodes. This heterogeneity of current density also leads to a need for a greater quantity of catalyst and leads to a not insignificant impact on the cost of the fuel cell.

The invention aims to tackle this drawback and to provide an alternative solution to this technical problem. The invention thus relates to a fuel cell as defined in the appended claims.

The invention further relates to a method for producing a fuel cell as defined in the appended claims.

Other features and advantages of the invention will emerge clearly from the description which is given below, as a guide and in no way restrictive, with reference to the appended drawings in which.

Figure 1:
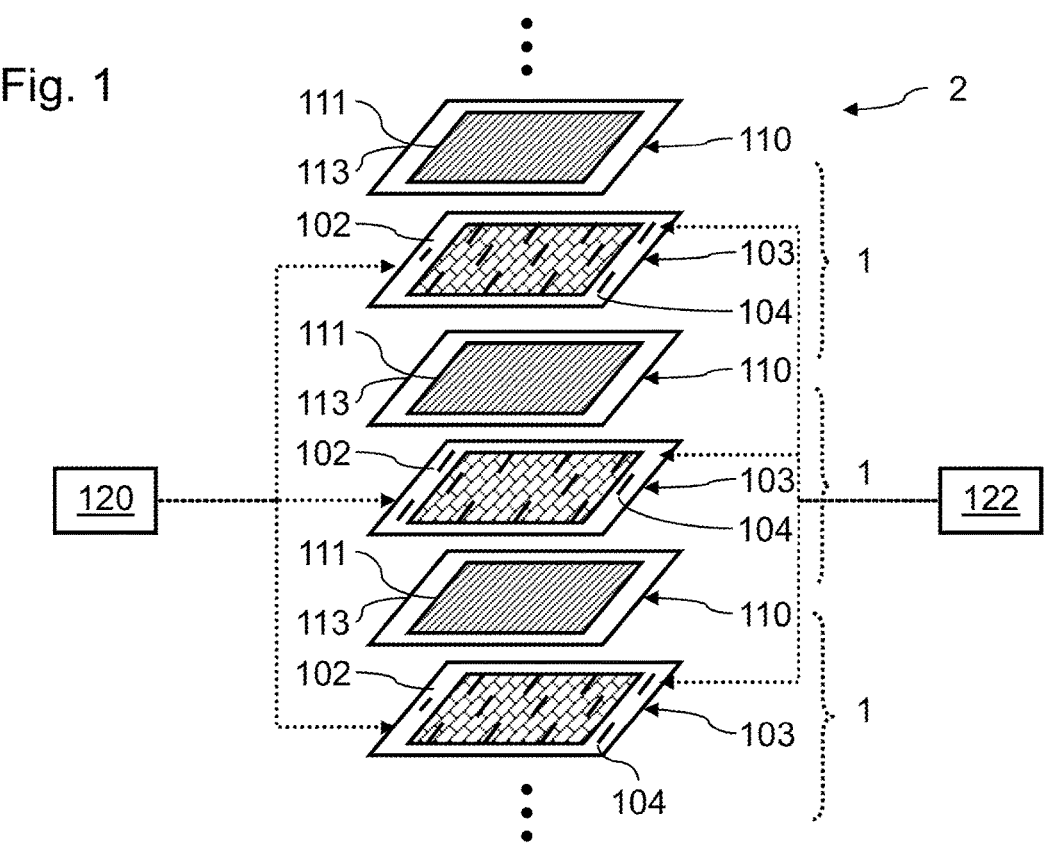
FIG. 1 is an exploded perspective view of an example of a fuel cell.

FIG. 1 is a schematic exploded perspective view of a stack of cells 1 of a fuel cell 2. The fuel cell 2 includes multiple superimposed cells 1. The cells 1 are of the proton exchange membrane or polymer electrolyte membrane type.

The fuel cell 2 includes a fuel source 120 supplying an inlet of each cell 1 with hydrogen. The fuel cell 2 also includes an air source 122 supplying an inlet of each cell with air, containing the oxygen used as an oxidant. Each cell 1 also includes exhaust channels. Each cell 1 may also exhibit a cooling circuit (illustrated in FIG. 2).

Each cell 1 includes a membrane/electrode assembly 110. The illustrated fuel cell 2 notably includes membrane/electrode assemblies or MEAs 110. A membrane/electrode assembly 110 includes an electrolyte 113, a cathode 112 (not illustrated in FIG. 1) and an anode 111 placed on each side of the electrolyte and attached to this electrolyte 113.

A pair of flow guides is arranged between each pair of adjacent MEAs. Each flow guide is, for example, formed of a metal sheet, usually made of stainless steel. The flow guides of each pair are rigidly connected here to form a bipolar plate 103. A bipolar plate 103 here includes a metal sheet 102 oriented toward a cathode of a MEA 110 and a metal sheet 101 (not illustrated in FIG. 1) oriented toward an anode of another MEA 110. The metal sheets 101 and 102 comprise relief surfaces defining flow channels 106 (not illustrated in FIG. 1). The metal sheets 101 and 102 are rigidly connected by welds 104. The combination of the metal sheets 101 and 102 form a conductor support.

In a manner known per se, during the operation of the cell 1, air flows between the MEA and the metal sheet 102, and hydrogen flows between the MEA and the metal sheet 101. The hydrogen is oxidized at the anode 111 to produce protons that pass through the MEA. The electrons produced by this reaction are collected by the metal sheet 102. The electrons produced are then applied to an electrical load connected to the fuel cell 2 to form an electric current. Oxygen is reduced at the cathode 112 and reacts with the protons to form water. The reactions at the anode and the cathode are governed as follows:

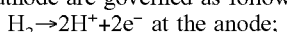
$H_2 \rightarrow 2H^+ + 2e^-$ at the anode;

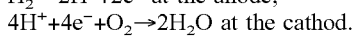
$4H^+ + 4e^- + O_2 \rightarrow 2H_2O$ at the cathod.

During its operation, a cell of the fuel cell usually generates a DC voltage between the anode and the cathode of the order of 0.7 V. The catalyst material used at the anode 111 or at the cathode 112 is advantageously made of platinum, for its excellent catalytic performance.

Figure 2:
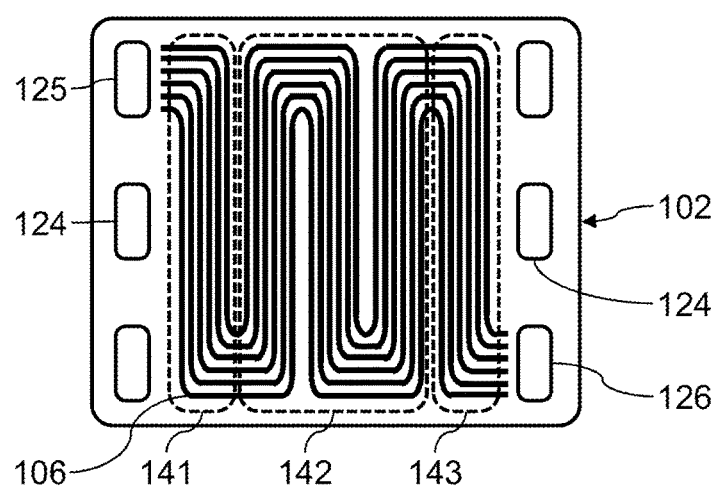
FIG. 2 is a top view of a bipolar plate comprising an example of a flow channel route.

FIG. 2 is a top view of an example of metal sheet 102 of a fuel cell 2. The metal sheet 102 delimits flow channels 106 defining parallel fluid flows. The flow channels 106 extend between an air inlet duct 125 and a water outlet duct 126. The metal sheet 102 is further traversed by a cooling liquid flow duct 124.

Figure 3:
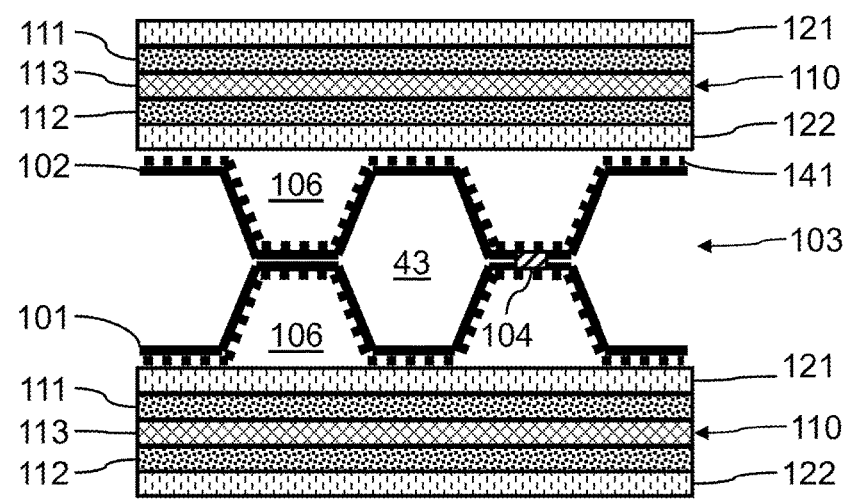
FIG. 3 is a view of a bipolar plate for an example of a fuel cell according to the invention, along a cross section of flow channels.

FIG. 3 illustrates the fuel cell in cross-section at the flow channels. A gas diffusion layer 122 is interposed in a way known per se between the cathode 112 and the metal sheet 102. A gas diffusion layer 121 is interposed in a way known per se between the anode 111 and the metal sheet 101. The cooling liquid channels 43 are arranged here between the metal sheets 101 and 102.

The flow channels 106 defined in the metal sheet 102 on the side of the cathode 112 are covered by multiple conductive coatings. The flow channels 106 defined in the metal sheet 101 on the side of the anode 111 are also covered by multiple conductive coatings. It is also conceivable that only one face of the bipolar plate 103, on the anode side or the cathode side, is covered with conductive coatings.

The bipolar plate 103 here comprises conductive coatings 141 to 143 attached to the metal sheet 102 at its flow channels 106. The conductive coating 141 is attached to the metal sheet 102 at the air inlet of the flow channels 106, e.g. over a length advantageously representing between 5 and 15% of the length of these flow channels. The conductive coating 142 is attached to the metal sheet 102 at a median portion of the flow channels 106, e.g. over a length advantageously representing between 25 and 50% of the length of the flow channels. The conductive coating 143 is attached to the metal sheet 103 at the water outlet of the flow channels 106, e.g. over a length advantageously representing between 5 and 15% of the length of these flow channels.

The conductive coating 142 exhibits a surface electrical resistance greater than that of the conductive coating 141, and a surface electrical resistance greater than that of the conductive coating 143. By using such differences in surface electrical resistances along the flow channels 106, the current density may be increased across the bipolar plate 103 at the air inlet and at the water outlet, and the current density reduced across the bipolar plate 103 at its median portion. Thus, the current density can be homogenized across the bipolar plate 103, and thus its degradation be reduced over time.

Figure 4:
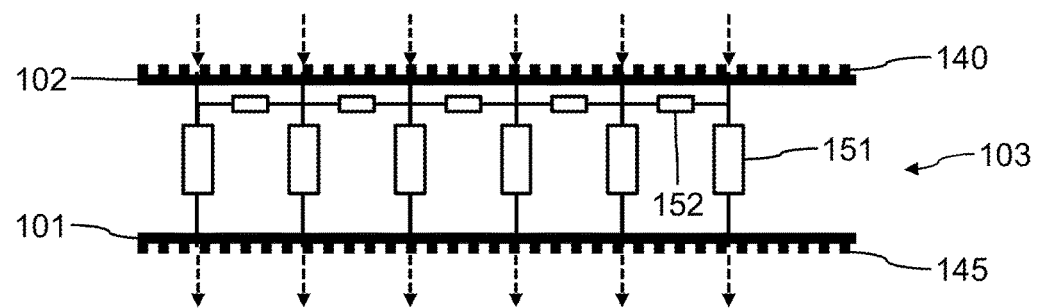
FIG. 4 is an equivalent electrical diagram of the bipolar plate in FIG. 3.

FIG. 4 represents an equivalent electrical diagram of the bipolar plate 103. The layer 140 represents the combination of coatings 141 to 143. The layer 145 represents the combination of conductive coatings arranged on the metal sheet 101. The conductor support formed of metal sheets 101 and 102 defines electrical junctions in the plane of the bipolar plate 103, represented by resistors 152. The different coatings of the layers 140 and 145 induce different electrical junctions in the thickness of the bipolar plate 103, represented by resistors 151. As a result of the differences in surface resistance of the different conductive coatings, the resistors 151 exhibit different values. When a current is applied across the thickness of the bipolar plate 103, the different resistor 151 values induce transverse currents across the resistors 152. In order to promote transverse currents in the bipolar plate 103, the conductive coatings of the layers 140 and 145 advantageously exhibit a resistivity at least double that of the conductor support, here formed of conductive sheets 101 and 102.

Figure 5:
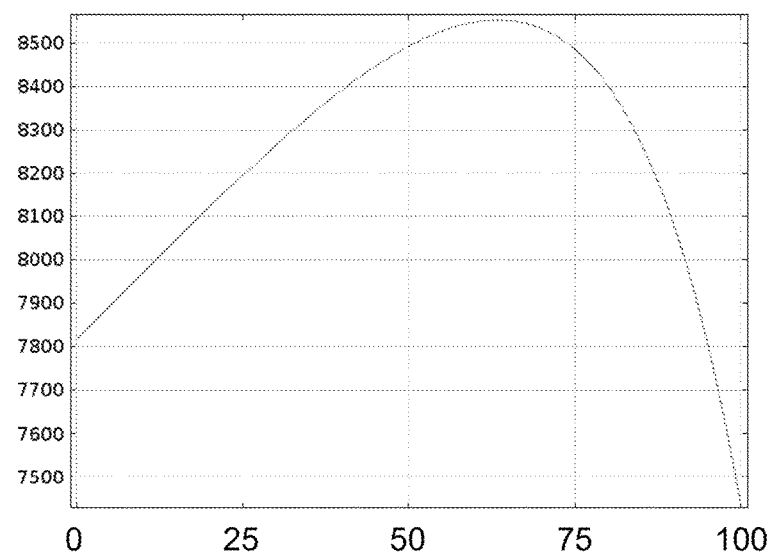
FIG. 5 is a diagram of the current density across a bipolar plate of a fuel cell according to the prior art according to the position between an inlet and an outlet of a flow channel.

FIG. 5 illustrates an example of current density across a bipolar plate of the prior art exhibiting a homogeneous surface resistance, along a flow channel. The position on the abscissa is defined as a percentage with respect to the length of the flow channel 106 between its air inlet and its water outlet (a flow channel on the cathode side is taken here for reference).

Figure 6:
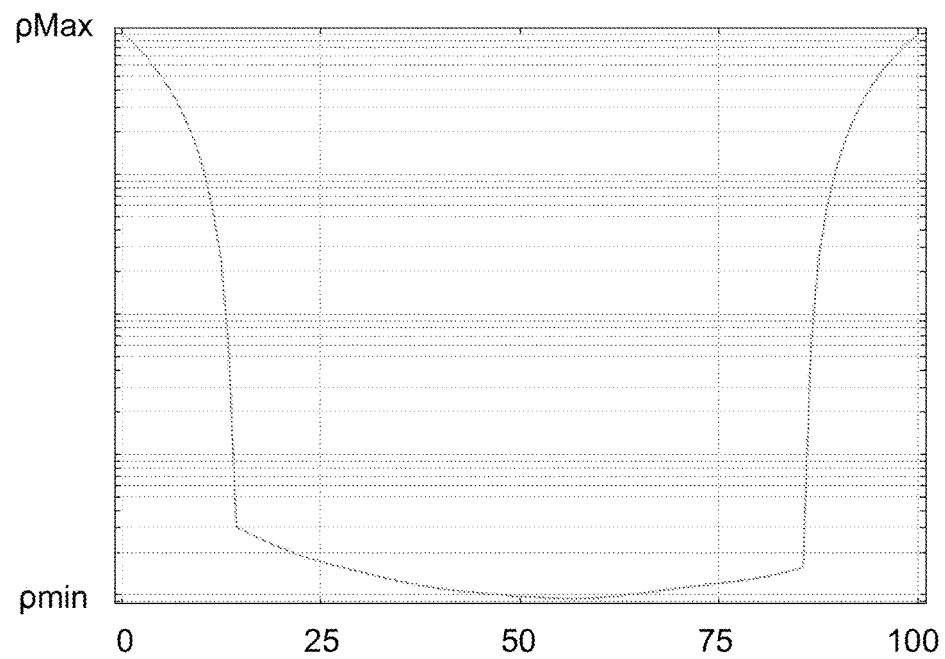
FIG. 6 is a diagram of the conductivity of a bipolar plate coating according to the invention according to the position between an inlet and an outlet of a flow channel.

FIG. 6 illustrates an example of resistivity of a material of a layer attached to a flow channel 106, varying between a resistivity value pmin and a resistivity value pMax along a flow channel, the ordinate being illustrated according to a logarithmic scale. The layer thus formed may exhibit a continuous thickness, so that the surface resistance here is proportional to the local resistivity of the layer material. The person skilled in the art will know how to form local areas of the layer material for obtaining the desired local resistivities for this layer.

Figure 7:
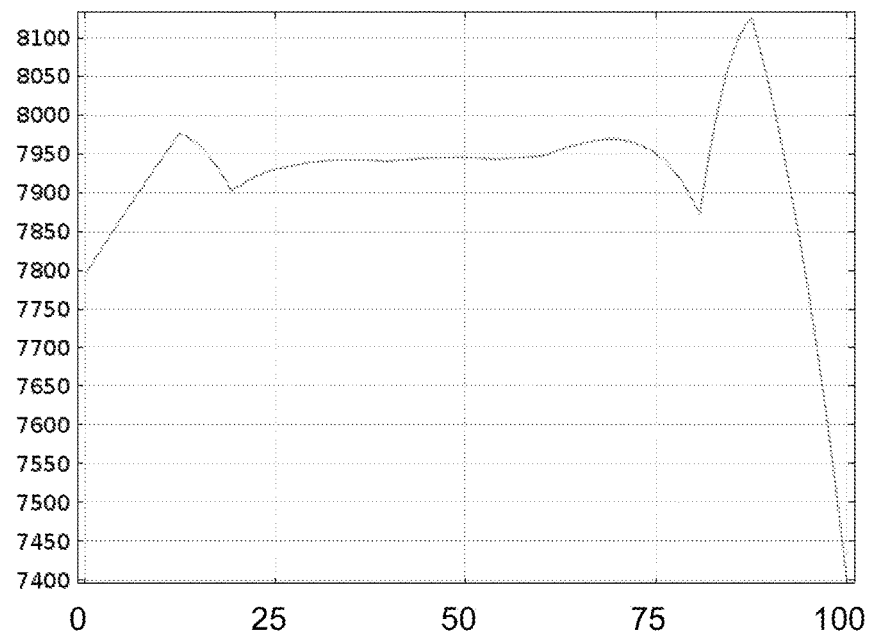
FIG. 7 is a diagram of the current density across a bipolar plate of a fuel cell according to the invention according to the position between an inlet and an outlet of a flow channel.

FIG. 7 illustrates an example of a current density across a bipolar plate according to the invention, in which the surface resistance at the median portion of a flow channel is greater than the surface resistance at the ends of this flow channel. Compared with the diagram of current density in FIG. 5, it should be noted that the current density here is clearly more homogeneous over the length of the flow channel.

The coatings attached to the conductor support of the bipolar plate may exhibit a homogeneous surface resistance or a continuously varying surface resistance. The median portion may include different coatings each with a distinct surface resistance.

In a non-restrictive way, the following solutions may be devised for obtaining multiple coatings exhibiting different surface resistances.

For example, the different coatings may include materials exhibiting different conductivities, e.g. silver (approximately 5 mohm/cm$^2$), nanotubes (approximately 15 mohm/cm$^2$), or graphite (approximately 25 mohm/cm$^2$).

Moreover, different surface resistances may be planned to be obtained by using different thicknesses for the different coatings, by optionally using different coatings exhibiting the same composition.

It is also conceivable to produce coatings in the form of deposits including a polymer matrix in which conductive particles are embedded in sufficient quantity so as to make the coating conductive. The different coatings may be produced with different proportions of the same polymer matrix and the same conductive particles.

For example, deposits of polyurethane matrices may be produced including particles of graphite, with proportions by weight of between 30 and 70% of graphite particles (the proportion by weight of polyurethane being complementary). A polyurethane matrix deposit with a proportion by weight of 30% of graphite particles typically exhibits a resistivity of 25 mohm/cm$^2$, a polyurethane matrix deposit with a proportion by weight of 70% of graphite particles typically exhibits a resistivity of 60 mohm/cm$^2$.

Figure 8:
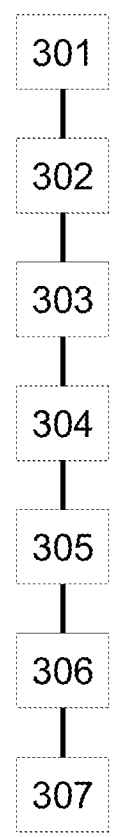
FIG. 8 is a flow chart of an example of a method for producing a fuel cell.

FIG. 8 represents a flow chart of the steps implemented in an example of a method for designing and producing a fuel cell according to the invention.

In a preliminary design step 301, a fuel cell may be assembled with electrochemical cells and bipolar plates according to the prior art. By using a localized current acquisition card, the distribution of current densities along a flow channel 106 is then determined. Such an acquisition card is used, for example, to obtain a diagram such as the one illustrated in FIG. 5. The determined current densities thus take into account the variation in relative humidity along the flow channel and the variation in oxygen content along the cathode flow channel.

On the basis of the current densities determined along the flow channel, conductive coatings may be selected to be applied on the bipolar plate along the flow channel, in order to homogenize the current density across this bipolar plate, in a step 302.

In a step 303, two stamped metal sheets are assembled to form a conductor support of a bipolar plate. The conductor support is identical to that of the fuel cell assembled in step 301.

In a step 304, conductive coatings are deposited on one or two faces of the conductor support, and correspond to the selected conductive coatings. This step may, for example, be implemented by deposits of different inks along the flow channels. The inks may include a matrix of polymer material including conductive particles.

In a step 305, two fuel cell electrochemical cells are positioned on each side of the bipolar plate, e.g. two membrane/electrode assemblies. Gas diffusion layers may be interposed between the electrochemical cells and the bipolar plate. The electrochemical cells and the gas diffusion layers are identical to those of the fuel cell assembled in step 301.

In a step 306, the production of the fuel cell is continued, by forming a stack with other electrochemical cells and other bipolar plates, and by adding other components such as centering pins, seals, or clamping plates.

The invention claimed is:

1. A fuel cell, comprising:
   first and second electrochemical cells;
   a bipolar plate arranged between the first and second electrochemical cells, including a conductor support delimiting a first flow channel facing the first electrochemical cell and extending between an air inlet and a water outlet, and including a first conductive coating attached to the conductor support at the air inlet of the first flow channel and including a second conductive coating attached to the conductor support at a median portion of the first flow channel, the second conductive coating exhibiting a surface electrical resistance greater than that of the first conductive coating.

2. The fuel cell as claimed in claim 1, wherein the bipolar plate includes a third conductive coating attached to the conductor support at the water outlet of the first flow channel, the second conductive coating exhibiting a surface electrical resistance greater than that of the third conductive coating.

3. The fuel cell as claimed in claim 1, wherein the conductive coatings each include a polymer matrix and conductive particles embedded in the polymer matrix.

4. The fuel cell as claimed in claim 3, wherein the first and second conductive coatings include a same polymer matrix and a same conductive particles in different proportions.

5. The fuel cell as claimed in claim 1, wherein the second conductive coating exhibits a surface electrical resistance at least double that of the first conductive coating.

6. The fuel cell as claimed in claim 1, wherein the conductive coatings exhibit a resistivity at least double resistivity of the conductor support.

7. The fuel cell as claimed in claim 1, wherein the first flow channel faces a cathode of the first electrochemical cell.

8. A method for producing a fuel cell according to claim 1, comprising:
   providing a bipolar plate including a conductor support delimiting a first flow channel extending between an air inlet and a water outlet;
   attaching a first conductive coating to the conductor support at the air inlet of the first flow channel and attaching a second conductive coating to the conductor support at a median portion of the first flow channel, the second conductive coating exhibiting a surface electrical resistance greater than that of the first conductive coating;
   arranging the bipolar plate between the first and second electrochemical cells, with the first flow channel facing the first electrochemical cell.

9. The method for producing a fuel cell as claimed in claim 8, wherein the attaching the first and second conductive coatings includes deposition of polymer matrices in which conductive particles are embedded.

10. The method for producing a fuel cell as claimed in claim 9, wherein the first and second conductive coatings include a same polymer matrix and a same conductive particles in different proportions.

* * * * *